Patented Apr. 28, 1953

2,636,879

UNITED STATES PATENT OFFICE 2,636,879

MANUFACTURE OF CELLULOSE ETHERS

Wiley Monroe Branan, Penns Grove, N. J., and Lawton Arthur Burrows, Mendenhall, and Bill Harry Mackey, West Chester, Pa., assignors to E. I. du Pont de Nemours & Company, Wilmington, Del., a corporation of Delaware No Drawing. Application April 27, 1950, Serial No. 158,584

8 Claims. (Cl. 260—231)

This invention relates to the manufacture of sodium carboxymethyl cellulose and, more particularly, to an improved process for producing a water soluble sodium carboxymethyl cellulose.

This application is a continuation-in-part of our copending application, Serial No. 11,326, filed February 26, 1948, now abandoned.

The sodium salt of carboxymethyl cellulose is made by reacting cellulose with an alkali and an etherifying agent such as monochloroacetic acid or sodium monochloroacetate. In general, two courses of action have been open for the production of water soluble sodium carboxymethyl cellulose. The first involves mixing the cellulose with the alkali and etherifying agent in the presence of water as the only liquid. This is usually accomplished by steeping the cellulose in an aqueous alkali solution followed by pressing to remove the excess alkali. The alkali cellulose thus formed is shredded in a mixer equipped with serrated blades or similar equipment for a period of time sufficient to fluff or tear the material after which the etherifying agent is mixed in and reacted. This general procedure is characterized by excessive times for mixing or intermingling of the ingredients to obtain uniform distribution of the reactants and to insure attainment of a reasonably uniform product. Moreover, substantially completely water soluble carboxymethyl cellulose can be produced only by the adoption of excess ratios of the reacting ingredients. Thus it has been necessary to use excessive quantities of expensive monochloroacetic acid or sodium chloroacetate. The disadvantages from an economic standpoint are obvious.

An alternate method known in the art involves the addition of an organic agent such as methanol, ethanol, isopropanol and the like to replace a portion of the water otherwise required for distribution of the ingredients. When such a course of action is pursued, the cellulose has usually been in a shredded form resulting from passage of the cellulose through available commercial equipment which fluffs or tears the cellulose but does not destroy its fibrous characteristics. Such shredded cellulose usually has a low bulk density of about 3 pounds per cubic foot but may be as high as 12 pounds per cubic foot. When an organic agent is used it is then possible to produce a water soluble sodium carboxymethyl cellulose without employing excessive ratios of the reacting ingredient and with reasonable reaction efficiency. The organic medium for which the cellulose has less affinity serves better to distribute the ingredients. Excluding part of the water which would otherwise be required to effect distribution of the ingredients reduces the tendency of the monochloroacetic acid to hydrolyze to glycollic acid or its sodium salt and thus effectively to be lost for etherifying purposes. The addition of an organic medium possesses disadvantages because of the expense of the medium itself as an essential material, because of the cost of recovering it and because all of the known organic agents which are used in this process are flammable and form explosive mixtures with air so that elaborate precautions must be taken to guard against accidental explosion.

The object of the present invention is an improved process for producing a water soluble sodium carboxymethyl cellulose. Another object is a process characterized by high reaction efficiency which yields a free-flowing, water soluble product of suitable degree of etherification. A further object is a process for making water soluble sodium carboxymethyl cellulose which obviates the need for using an organic medium. A still further object is an improved process for making water soluble sodium carboxymethyl cellulose which is characterized by efficient utilization of reaction ingredients and which is further characterized by short periods for intermingling said ingredients.

We have found that the foregoing objects are obtained by reacting a purified cellulose of granular form and having an average particle size of less than 150 microns with an alkali and an etherifying agent such as monochloroacetic acid or sodium chloroacetate. The term "purified cellulose" is intended to mean what is known in the trade as chemical cellulose and is characterized by a purity of at least 99% and has an alpha content of at least 90%. The term "granular" is used to distinguish the form of cellulose particle from the usual fibrous form in which it occurs or is available. The granules when examined under a microscope do not possess any of the usual fibrous characteristics. Furthermore, cellulose in this form is free flowing and does not tend to mat as does the fibrous material. The average bulk density of the granular cellulose is about 30 pounds per cubic foot.

We have found that purified cellulose in granular form as described in the foregoing can be reacted with sodium hydroxide and monochloroacetic acid using ordinary mixing means in a short period of time without the necessity of having an organic medium present to yield a water soluble carboxymethyl cellulose having a degree of etherification between 0.40 and 0.75. By degree of etherification we mean the number of carboxymethyl units which have been added to each anhydroglucose unit of the cellulose molecule and this term is used with this meaning throughout the specification. The water solubility of sodium carboxymethyl cellulose increases with an increase in degree of etherification and, in a uniformly substituted product, complete water solubility is considered to be obtained within a range of degree of etherification of at least 0.3 to 0.4. Furthermore, this can be done without requiring excessive ratios of ingredients. Thus it is possible to obtain the desired results by using a theoretical degree of etherification (T. D. E.) between 0.7 and 1.3. Such actual degrees of etherification at these theoretical degrees of etherification represent reaction efficiencies in excess of 50%. The theoretical degree of etherification is defined as the ratio of the mols of etherifying agent to the mols of cellulose and the reaction efficiency is defined as the ratio of the actual degree of etherification to the theoretical degree of etherification, multiplied by 100. The purity of the water soluble carboxymethyl cellulose resulting is on the order of 55 to 75% on a dry basis. Solutions made with this material are characterized by the absence of significant quantities of insoluble material.

The following examples will illustrate more specifically the modus operandi of the present invention:

Example 1

173.5 pounds of a 36 percent aqueous solution of sodium hydroxide at 25° C. were placed in a 100 gallon Werner-Pfleiderer type mixer which was cooled by means of a brine solution at −14° C. circulating through the mixer jacket. 150 pounds of the finely-divided granular cellulosic material (bulk density 30 pounds per cubic foot) were then added and the mixture agitated for 15 minutes. 34¼ pounds of monochloroacetic acid were added and the mixing continued for 15 minutes. 34¼ pounds of monochloroacetic acid were then added and the mixing continued 30 minutes after which the mixture was removed and permitted to react in a static state for 10 hours. The product was then milled to break apart the agglomeration and render it free flowing and then packed. The product was essentially completely soluble in water. The sodium carboxymethyl cellulose content of the damp product was 48 percent. A sample which was dried completely had a sodium carboxymethyl cellulose content of 70 percent.

The formulation was based on a T. D. E. of 0.83. The actual degree of etherification of the sodium carboxymethyl cellulose was 0.60 representing a reaction efficiency of 72.3 percent.

Example 2

218 pounds of a 36.4 percent aqueous solution of sodium hydroxide at 25° C. were placed in a 100 gallon Werner-Pfleiderer type mixer which was cooled by means of a brine solution at −14° C. circulating through the mixer jacket. 150 pounds of the finely-divided granular cellulosic material (bulk density 30 pounds per cubic foot) were then added and the mixture agitated for 15 minutes. 34¼ pounds of monochloroacetic acid were added and the mixing continued for 15 minutes. 34¼ pounds of monochloroacetic acid were then added and the mixing continued 30 minutes after which the mixture was removed and permitted to react in a static state for 10 hours. The product was returned to the mixer and 60 pounds of a 41.3 percent aqueous solution of orthophosphoric acid added and mixed 15 minutes. The product was removed from the mixer, milled to break apart the agglomeration and to render it free flowing and then packed. The product was essentially completely soluble in water. The sodium carboxymethyl cellulose content of the damp product was 36.9 percent. The product may be dried and milled to break apart the particle agglomerates and reduce it to the form of the original cellulosic ingredient. When dried completely, the sodium carboxymethyl cellulose content of the product is 62 percent.

The formulation was based on a T. D. E. of 0.83. The degree of etherification of the sodium carboxymethyl cellulose was 0.50 representing a reaction efficiency of 60.2 percent.

Example 3

218 pounds of a 36.4 percent aqueous solution of sodium hydroxide at 15° C. were placed in a 100 gallon Werner-Pfleiderer type mixer which was cooled by means of a brine solution at −14° C. circulating through the mixer jacket. 150 pounds of the finely-divided granular cellulosic material (bulk density 30 pounds per cubic foot) were added and the mixture agitated 10 minutes. 34¼ pounds of monochloroacetic acid were added and the mixing continued 10 minutes. 34¼ pounds of monochloroacetic acid were then added and the mixing continued 10 minutes after which the brine in the mixer jacket was exchanged for steam and the charge heated to 80° C. It was maintained at 80° C. for 20 minutes additional mixing after which a solution of 60 pounds of 41.3 percent aqueous solution of orthophosphoric acid were added and mixing continued 15 minutes with cooling. The product was removed and milled to break apart the agglomeration and render it free flowing and then packed. The product was essentially completely soluble in water and duplicated the properties described for the product derived in Example 2. The efficiencies attributed to Example 2 were also duplicated.

Example 4

217 pounds of a 36 percent aqueous solution of sodium hydroxide at 15° C. were placed in a 100 gallon Werner-Pfleiderer type mixer which was cooled by means of a brine solution at −14° C. circulating through the mixer jacket. 150 pounds of the finely-divided granular cellulosic material (bulk density 30 pounds per cubic foot) were then added and the mixture agitated for 15 minutes. 45½ pounds of monochloroacetic acid were added and the mixing continued for 15 minutes. 45½ pounds of monochloroacetic acid were then added and the mixing continued 30 minutes after which the mixture was removed and permitted to react in a static state for 10 hours. The product was then milled to break apart the agglomeration and render it free flowing and then packed. The product was essentially completely soluble in water. The sodium carboxymethyl cellulose content of the damp product was 42.8 percent. The product may be dried and milled which breaks apart the particle agglomerates and reduces it to the form of the original cellulosic ingredient. When dried completely, the sodium carboxymethyl cellulose content of the product is 67.1 percent.

The formulation was based on a T. D. E. of 1.10. The degree of etherification of the sodium carboxymethyl cellulose was 0.68 representing a reaction efficiency of 61.8 percent.

The foregoing examples represent several embodiments of the invention, said embodiments being directed to the production of technical grades of the sodium salt of carboxymethyl cellulose. These are referred to as technical grades because the byproduct salts such as sodium chloride, sodium glycollate, and sodium phosphate (this latter salt being present when the material is neutralized with phosphoric acid) have not been removed. In the event that it is desirable to obtain the sodium salt of carboxymethyl cellulose in a higher state of purity, the products obtained above can be washed with various solutions of ethanol, methanol, and the like. The strength of the washing medium is selected on the basis of having optimum solvent power for the removal of the sodium chlorides, glycollates and so forth without dissolution of significant quantities of the sodium carboxymethyl cellulose. Thus, a 65% by weight solution of ethanol has been established as suitable for the purification treatment. Removal of the impurities is effected by separation of the spent effluent from the solid by known mechanical means, viz. filters, centrifuges and the like. After washing, the resultant product may be dried in any suitable equipment normally used for the recovery of solvent vapors. The purity of the finished refined product, of course, depends upon the efficiency of the washing treatment. Sodium carboxymethyl cellulose having a purity of about 99% has been prepared in this manner. Here again, the particle size of the product is similar to that of the granular cellulose employed as the starting material.

In Examples I, II and IV, a very significant part of the reaction is permitted to go on in the static condition, that is, after the material has been removed from the mixers. It is desirable, the temperature during mixing can be increased so that the reaction rate is increased and essentially complete reaction can be obtained during the mixing period. This principle is illustrated in Example III. Need for permitting the reaction to continue in the static condition after discharge from the mixers may thus be obviated.

Although monochloroacetic acid has been set forth as the etherifying agent in the examples above, sodium chloroacetate can be used instead.

It will be understood that the examples given in the foregoing are set forth as specific embodiments of the invention and are not to be construed as limiting it. Thus acids other than phosphoric may be used to neutralize the sodium carboxymethyl cellulose. Acetic acid, nitric acid, and hydrochloric acid have been used advantageously as the neutralizing agents, particularly where it is desired to purify the sodium carboxymethyl cellulose further. In general, acids are selected on the basis of the ease of removal of the salts they form by the particular washing medium employed for the purification step.

We intend, therefore, to be bound only by the following claims.

1. A process for the production of water soluble sodium carboxymethyl cellulose which comprises reacting purified cellulose granules having an average particle size of less than 150 microns with aqueous caustic alkali solution and an etherifying agent, the ratio of the mols of etherifying agent to the mols of cellulose being in the range of 0.7 to 1.3, and water being the sole normally liquid ingredient present.

2. The process of claim 1, wherein the etherifying agent is monochloroacetic acid.

3. The process of claim 1, wherein the etherifying agent is sodium chloroacetate.

4. A process for the production of water soluble sodium carboxymethyl cellulose having a degree of etherification of at least 0.4 which comprises reacting purified cellulose granules having an average particle size of less than 150 microns with aqueous caustic alkali solution and monochloroacetic acid, the ratio of the mols of etherifying agent to the mols of cellulose being from 0.7 to 1.3, and water being the sole normally liquid ingredient present.

5. A process for the production of water soluble sodium carboxymethyl cellulose having a degree of etherification between 0.40 and 0.75 which consists in mixing purified cellulose granules with an aqueous caustic alkali solution, adding monochloroacetic acid in a ratio of the mols of etherifying agent to the mols of cellulose range of from 0.7 to 1.3, intermingling said monochloroacetic acid with the alkali cellulose, permitting the resultant mixture to continue to react in a static condition and then milling it to yield a free flowing product.

6. A process for producing water soluble sodium carboxymethyl cellulose having a degree of etherification of at least 0.40, which comprises intermingling purified cellulose granules with an aqueous caustic solution, adding to the resultant alkali cellulose monochloroacetic acid in such quantity that the ratio of the mols of etherifying agent to the mols of cellulose is within the range of 0.7 to 1.3, permitting the reaction to go to substantial completion, and milling the resultant product, and water being the sole normally liquid ingredient present.

7. A process for producing water soluble technical grade sodium carboxymethyl cellulose having a degree of etherification between 0.4 and 0.75, which comprises reacting purified granular cellulose with an aqueous sodium hydroxide solution, adding a quantity of monochloroacetic acid in the ratio of the mols of etherifying agent to the mols of cellulose range of 0.7 to 1.3 to the resultant alkali cellulose, and water being the sole normally liquid ingredient present, neutralizing the resultant product containing sodium carboxymethyl cellulose having an actual degree of etherification from 0.4 to 0.75, drying the neutralized material and milling to yield a granular free-flowing product.

8. The process of claim 7, wherein the neutralized material is purified by washing with an aqueous ethanol solution.

WILEY MONROE BRANAN.
LAWTON ARTHUR BURROWS.
BILL HARRY MACKEY.

References Cited in the file of this patent

UNITED STATES PATENTS

| Number | Name | Date |
|---|---|---|
| 1,960,551 | Richter | May 29, 1934 |
| 2,060,056 | Ellsworth | Nov. 10, 1936 |
| 2,067,946 | Picton | Jan. 19, 1937 |
| 2,236,545 | Maxwell et al. | Apr. 1, 1941 |
| 2,278,612 | Collings et al. | Apr. 7, 1942 |
| 2,294,666 | Jahrstorfer et al. | Sept. 1, 1942 |
| 2,332,048 | Bock et al. | Oct. 19, 1943 |
| 2,476,331 | Swinehart et al. | July 19, 1949 |
| 2,510,355 | Waldeck | June 6, 1950 |